(12) United States Patent
Valdes et al.

(10) Patent No.: US 12,294,404 B1
(45) Date of Patent: May 6, 2025

(54) PROTECTIVE CASE FOR PORTABLE ELECTRONIC DEVICES

(71) Applicant: ARROTECH GROUP LLC, Miami, FL (US)

(72) Inventors: Roberto Carlos Valdes, Miami, FL (US); Arturo Bendek, Miami, FL (US)

(73) Assignee: ARROTECH GROUP LLC, Miami, FL (US)

(*) Notice: Subject to any disclaimer, the term of this patent is extended or adjusted under 35 U.S.C. 154(b) by 463 days.

(21) Appl. No.: 18/047,534

(22) Filed: Oct. 18, 2022

(51) Int. Cl.
*H04B 1/3888* (2015.01)

(52) U.S. Cl.
CPC .................. *H04B 1/3888* (2013.01)

(58) Field of Classification Search
CPC ..................................... H04B 1/3888
USPC ........................................ 455/575.8
See application file for complete search history.

(56) References Cited

U.S. PATENT DOCUMENTS

| | | | | |
|---|---|---|---|---|
| 6,597,568 B2 * | 7/2003 | Ryder | ............... | G06F 1/1628 361/679.55 |
| 6,758,332 B2 * | 7/2004 | Miller | ............... | A45C 13/02 206/320 |
| 7,628,271 B1 * | 12/2009 | Marton | ............ | G06F 1/1628 206/320 |
| 8,567,578 B2 * | 10/2013 | Cuong | ............... | A45C 13/02 190/110 |
| 8,763,795 B1 * | 7/2014 | Oten | .................. | A45C 11/00 206/45.24 |
| 8,807,509 B2 * | 8/2014 | Swanepoel | ......... | A47G 1/20 40/760 |
| 9,206,309 B2 * | 12/2015 | Appleby | ............. | C08L 63/00 |
| 9,935,669 B1 * | 4/2018 | Kuo | ................ | A45C 13/1069 |
| 2004/0075371 A1 * | 4/2004 | Latchinian | ......... | A47F 3/004 312/265.4 |
| 2009/0257207 A1 * | 10/2009 | Wang | ............... | H04M 1/0252 361/752 |
| 2016/0128210 A1 * | 5/2016 | Lee | .................. | G06F 1/1626 248/206.5 |
| 2016/0150861 A1 * | 6/2016 | Yao | ................. | F16M 11/105 224/245 |
| 2017/0080251 A1 * | 3/2017 | Yehezkel | ........... | H04M 1/17 |
| 2020/0236799 A1 * | 7/2020 | Roth | .................... | F16B 2/12 |

FOREIGN PATENT DOCUMENTS

| | | | | |
|---|---|---|---|---|
| EP | 3095198 B1 * | 1/2019 | ........ | B29C 63/0004 |
| JP | 6664735 B1 * | 3/2020 | ............ | A45C 11/00 |
| WO | WO-2018015919 A2 * | 1/2018 | .......... | H04B 1/3888 |

* cited by examiner

*Primary Examiner* — Mahendra R Patel
(74) *Attorney, Agent, or Firm* — Albert Bordas P.A.

(57) ABSTRACT

A protective case for portable electronic devices, having a case assembly with a frame assembly. The frame assembly has first and second longitudinal frame members and first and second transversal frame members. The case assembly further has a rear wall joining the first and second longitudinal frame members and the first and second transversal frame members at a substantially perpendicular disposition. The rear wall has at least two apertures, wherein the at least two apertures have cooperative shapes and dimensions to removably receive heads of inserts, and the at least two apertures.

9 Claims, 3 Drawing Sheets

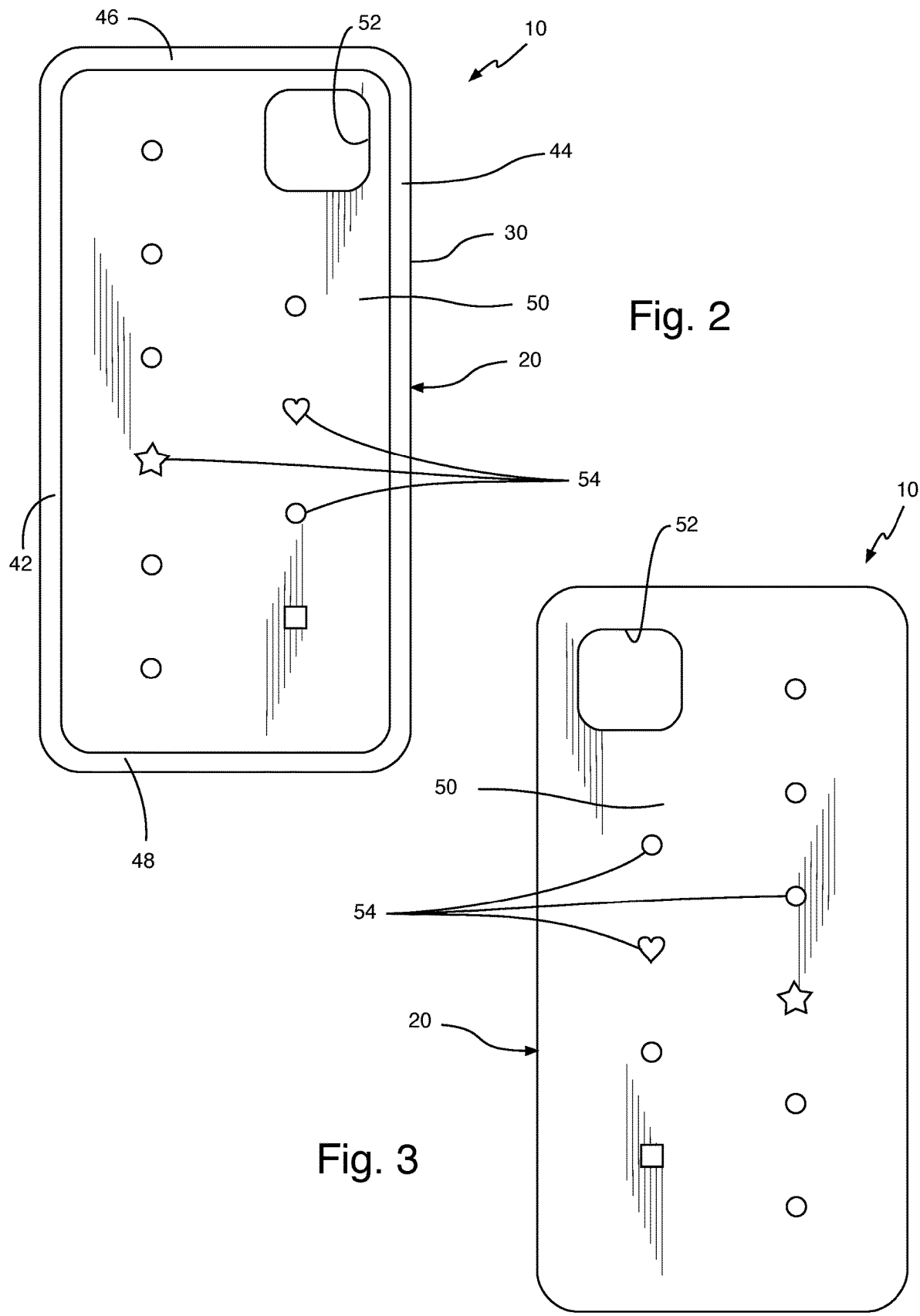

PROTECTIVE CASE FOR PORTABLE ELECTRONIC DEVICES

BACKGROUND OF THE INVENTION

1. Field of the Invention

The present invention relates to protective cases, and more particularly, to protective cases for portable electronic devices.

2. Description of the Related Art

Applicant is not aware of any protective cases for portable electronic devices that suggests the novel features of the present invention.

SUMMARY OF THE INVENTION

The present invention is a protective case for portable electronic devices, comprising a case assembly having a frame assembly. The frame assembly has first and second longitudinal frame members and first and second transversal frame members. The case assembly further comprises a rear wall joining the first and second longitudinal frame members and the first and second transversal frame members at a substantially perpendicular disposition. The rear wall comprises at least two apertures, wherein the at least two apertures have cooperative shapes and dimensions to removably receive heads of inserts, and the at least two apertures are sufficiently spaced apart from each other so that the inserts do not overlap with each other when the inserts are mounted onto the rear wall.

The inserts comprise a base and a post. The post has the head at its distal end. The first and second longitudinal frame members have respective first and second longitudinal frame edges, and the first and second transversal frame members have respective first and second transversal frame edges. The rear wall further comprises at least one hole. The inserts are selected from a group having different configurations and colors.

Furthermore, the present invention is a protective case for portable electronic devices, comprising a case assembly comprising a frame assembly and a rear wall. The frame assembly comprises first and second longitudinal frame members and first and second transversal frame members. The first and second longitudinal frame members have respective first and second longitudinal frame edges, and the first and second transversal frame members have respective first and second transversal frame edges. The rear wall joins the first and second longitudinal frame members and the first and second transversal frame members at their opposite edges. The rear wall is at a substantially perpendicular disposition with respect to the first and second longitudinal frame members and the first and second transversal frame members. The rear wall comprises at least one hole. The first and second longitudinal frame members, and/or the first and second transversal frame members also comprise at least one hole. The rear wall further comprises apertures spaced apart from each other. The apertures have cooperative shapes and dimensions to removably receive heads of inserts. The cooperative shapes are rectangle, circle, triangle, oval, parallelogram, trapezium, pentagon, hexagon, diamond, right triangle, heptagon, octagon, decagon, dodecagon, square, rhombus, semicircle, star, heart, crescent, and cross.

The apertures are sufficiently spaced apart from each other so that the inserts, and specifically exterior walls of the inserts, do not overlap with each other when mounted onto the rear wall.

The apertures are a predetermined distance from the first and second longitudinal frame members and the first and second transversal frame members so that the inserts, and specifically the exterior walls, do not extend beyond any side of a perimeter defined by the rear wall.

The insert comprises a base and a post. The post has the head at its distal end. The base has an exterior wall, and the apertures removably receive the heads of the posts therein. The heads of the inserts complement cooperative shapes of the apertures and are slightly larger than a respective aperture, wherein the heads are shaped as rectangle, circle, triangle, oval, parallelogram, trapezium, pentagon, hexagon, diamond, right triangle, heptagon, octagon, decagon, dodecagon, square, rhombus, semicircle, star, heart, crescent, and cross. The apertures are also sufficiently elastic to stretch, to allow the heads to be inserted therethrough, and then return to their original shape and size.

It is therefore one of the main objects of the present invention to provide protective cases for portable electronic devices.

It is another object of this invention to provide protective cases for portable electronic devices, having a rear wall with apertures of cooperative shapes and dimensions to removably receive inserts of different configurations, shapes and colors, according to a user preference.

It is another object of this invention to provide protective cases for portable electronic devices that are volumetrically efficient for carrying, transporting, and storage.

It is another object of this invention to provide protective cases for portable electronic devices that can be readily assembled and disassembled without the need of any special tools.

It is another object of this invention to provide a protective case for portable electronic devices, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 is a front elevational view of the present invention showing the interior side of rear wall 50.

FIG. 3 is a rear elevational view of the present invention showing an exterior side of rear wall 50.

DETAILED DESCRIPTION OF THE PREFERRED EMBODIMENT

Figure 1:
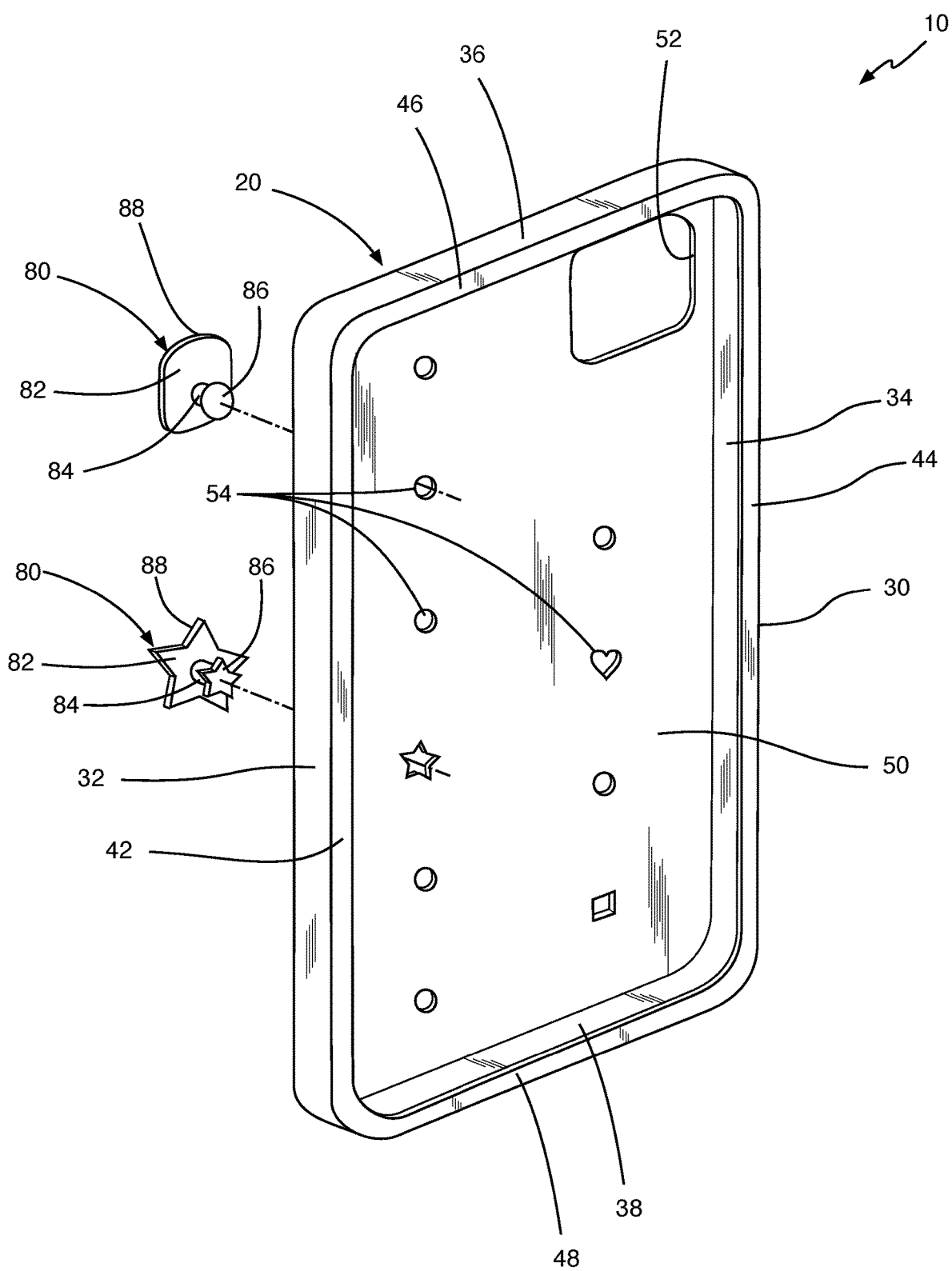
FIG. 1 represents a front isometric view of a protective case for portable electronic devices showing an interior side of rear wall 50, and a sample insert.

Referring now to the drawings, the present invention is a protective case for portable electronic devices and is generally referred to with numeral 10. It can be observed that it basically includes case assembly 20.

As seen in FIGS. 1, 2, and 3, case assembly 20 comprises frame assembly 30 and rear wall 50. Frame assembly 30 comprises longitudinal frame members 32 and 34, and transversal frame members 36 and 38. Longitudinal frame members 32 and 34 have respective longitudinal frame edges 42 and 44, and transversal frame members 36 and 38 have respective transversal frame edges 46 and 48. Rear wall 50 joins longitudinal frame members 32 and 34, and transversal frame members 36 and 38 at their opposite edges. Rear wall 50 is at a substantially perpendicular disposition with respect to longitudinal frame members 32 and 34, and transversal frame members 36 and 38.

Rear wall 50 comprises at least one hole 52 at cooperative positions to coincide with switches, cameras, lights, speakers, microphones, and/or other features of electronic devices intended to be housed therein, not shown. Although not illustrated, it is understood that longitudinal frame members 32 and 34, and/or transversal frame members 36 and 38 may also comprise at least one hole 52 at cooperative positions to coincide with switches, cameras, lights, speakers, microphones, and/or other features of electronic devices intended to be housed therein, not shown. Such electronic devices include, but are not limited to, smart phones, computers, tablets, etc. Rear wall 50 further comprises apertures 54 spaced apart from each other.

Figure 4:
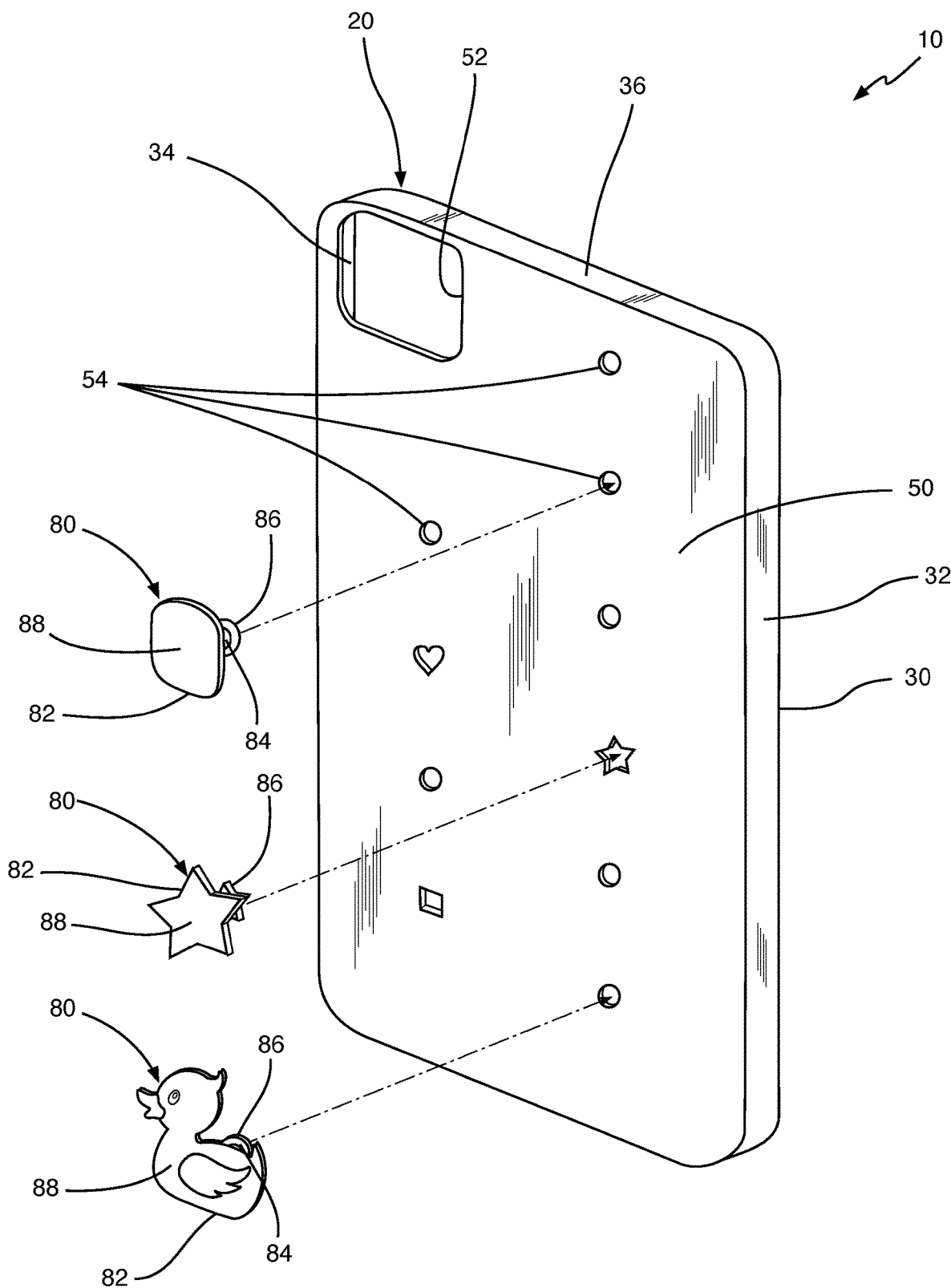
FIG. 4 is a rear isometric view of the present invention, illustrating sample inserts to be mounted onto the exterior side of rear wall 50.

As seen in FIG. 4, in a preferred embodiment, apertures 54 have cooperative shapes and dimensions to removably receive heads 86 of inserts 80. Such cooperative shapes of apertures 54 are, but are not limited to, rectangle, circle, triangle, oval, parallelogram, trapezium, pentagon, hexagon, diamond, right triangle, heptagon, octagon, decagon, dodecagon, square, rhombus, semicircle, star, heart, crescent, cross, and rainbow. Such cooperative shapes of apertures 54 may also be any animal design; insect design; plant, shrub, and tree design; sea life design, any geometric shapes, and any trademark, service mark, or logo design.

Although not illustrated, longitudinal frame members 32 and 34, and/or transversal frame members 36 and 38 may also comprise apertures 54 have cooperative shapes and dimensions to removably receive heads 86 of inserts 80.

In a preferred embodiment, apertures 54 are sufficiently spaced apart from each other so that inserts 80, and specifically exterior walls 88, do not overlap with each other when mounted onto rear wall 50. In a preferred embodiment, apertures 54 are also a predetermined distance from longitudinal frame members 32 and 34 and transversal frame members 36 and 38 so that inserts 80, and specifically exterior walls 88, do not extend beyond any side of a perimeter defined by rear wall 50.

Inserts 80 comprises base 82 and post 84. Post 84 has head 86 at its distal end. Base 82 may have different shapes and sizes. In a preferred embodiment, heads 86 of inserts 80 may have cooperative shapes and dimensions to removably be inserted into apertures 54. Such cooperative shapes of heads 86 are, but are not limited to, rectangle, circle, triangle, oval, parallelogram, trapezium, pentagon, hexagon, diamond, right triangle, heptagon, octagon, decagon, dodecagon, square, rhombus, semicircle, star, heart, crescent, cross, and rainbow. Such cooperative shapes of heads 86 may also be any animal design; insect design; plant, shrub, and tree design; sea life design, any geometric shapes, and any trademark, service mark, or logo design.

In an alternate embodiment, heads 86 are not the same cooperative shapes as apertures 54.

Base 82 has exterior wall 88, which may be of different configurations and/or colors according to a user preference. Exterior wall 88 may be rectangle, circle, triangle, oval, parallelogram, trapezium, pentagon, hexagon, diamond, right triangle, heptagon, octagon, decagon, dodecagon, square, rhombus, semicircle, star, heart, crescent, cross, and rainbow. Exterior wall 88 may also be any animal design; insect design; plant, shrub, and tree design; sea life design, any geometric shapes, and any trademark, service mark, or logo design. Apertures 54 removably receive heads 86 of posts 84 therein. In a preferred embodiment, heads 86 of inserts 80 complement the cooperative shapes of apertures 54 and are slightly larger than a respective aperture 54.

As an example, in a preferred embodiment, a head 86 of an insert 80 has a star shape and is slightly larger than a respective aperture 54 that is also star in shape, so that a predetermined force is required to force head 86 of the insert 80 having the star shape into the slightly smaller aperture 54 that is also star in shape. It is noted that once insert 80 is mounted onto present invention 10, base 82 and exterior wall 88 of insert 80 remain on the exterior side of rear wall 50.

As another example, in an alternate embodiment, a head 86 of an insert 80 has a circular shape and is slightly larger than an aperture 54 that is triangular in shape, so that a predetermined force is required to force head 86 of the insert 80 having the circular shape into the slightly smaller aperture 54 that is triangular in shape. It is again noted that once insert 80 is mounted onto present invention 10, base 82 and exterior wall 88 of insert 80 remain on the exterior side of rear wall 50.

In a preferred embodiment, rear wall 50, and particularly apertures 54, are sufficiently elastic to stretch, to allow the heads 86 to be inserted therethrough, and then apertures 54 return to their original shape and size. In an alternate embodiment, rear wall 50, and particularly apertures 54 are rigid and not elastic. In this embodiment, heads 86 are sufficiently elastic to conform and allow heads 86 to be inserted through apertures 54, and then heads 86 return to their original shape and size.

Although not illustrated, it is understood that once all the desired inserts 80 have been mounted onto rear wall 50, an electronic device, such as a smart phone, computer, tablet, etc. is then positioned and inserted within present invention 10. Thus, covering the interior side of rear wall 50 seen in FIG. 1. It is noted that in a preferred embodiment, heads 86 are relatively flat to not damage the flat rear side (opposite the screen) of the smart phone, computer, tablet, etc. It is noted that the smart phone, computer, tablet, etc. and its respective edges will snugly fit within longitudinal frame members 32 and 34 and transversal frame members 36 and 38 of present invention 10 to safely remain therein, while exposing the smart phone, computer, tablet, etc.'s screen.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A protective case for portable electronic devices, comprising a case assembly having a frame assembly, said frame assembly having first and second longitudinal frame members and first and second transversal frame members, said a case assembly further comprises a rear wall joining said first and second longitudinal frame members and said first and second transversal frame members at a substantially perpendicular disposition, said rear wall comprising at least two apertures, wherein said at least two apertures have cooperative shapes and dimensions to removably receive heads of inserts, each of said inserts comprises a base and a post, said post having said head at its distal end, said first and second longitudinal frame members having respective first and second longitudinal frame edges, and said first and second transversal frame members having respective first and second transversal frame edges, said rear wall further comprises at least one hole, said inserts are selected from a group having different configurations and colors.

2. A protective case for portable electronic devices, comprising a case assembly comprising a frame assembly and a rear wall, said frame assembly comprises first and second longitudinal frame members and first and second transversal frame members, said first and second longitudinal frame members have respective first and second longitudinal frame edges, and said first and second transversal frame members have respective first and second transversal frame edges, said rear wall joins said first and second longitudinal frame members and said first and second transversal frame members at their opposite edges, said rear wall is at a substantially perpendicular disposition with respect to said first and second longitudinal frame members and said first and second transversal frame members, said rear wall comprises at least one hole, and said first and second longitudinal frame members, and/or said first and second transversal frame members also comprise at least one hole, and said rear wall further comprises apertures that have cooperative shapes and dimensions to removably receive heads of inserts, each of said inserts comprises a base and a post, said post having said head at its distal end, and said inserts are selected from a group having different configurations and colors.

3. The protective case for portable electronic devices set forth in claim 2, wherein said cooperative shapes are rectangle, circle, triangle, oval, parallelogram, trapezium, pentagon, hexagon, diamond, right triangle, heptagon, octagon, decagon, dodecagon, square, rhombus, semicircle, star, heart, crescent, and cross.

4. The protective case for portable electronic devices set forth in claim 3, wherein said apertures are sufficiently spaced apart from each other so that said inserts, and specifically exterior walls of said inserts, do not overlap with each other when mounted onto said rear wall.

5. The protective case for portable electronic devices set forth in claim 4, wherein said apertures are a predetermined distance from said first and second longitudinal frame members and said first and second transversal frame members so that said inserts, and specifically said exterior walls, do not extend beyond any side of a perimeter defined by said rear wall.

6. The protective case for portable electronic devices set forth in claim 5, wherein each said insert comprises a base and a post, said post has said head at its distal end, said base has an exterior wall, and said apertures removably receive said heads of said posts therein.

7. The protective case for portable electronic devices set forth in claim 6, wherein said heads of said inserts complement cooperative shapes of said apertures and are slightly larger than a respective said aperture.

8. The protective case for portable electronic devices set forth in claim 6, wherein said heads shaped as said rectangle, said circle, said triangle, said oval, said parallelogram, said trapezium, said pentagon, said hexagon, said diamond, said right triangle, said heptagon, said octagon, said decagon, said dodecagon, said square, said rhombus, said semicircle, said star, said heart, said crescent, and said cross.

9. The protective case for portable electronic devices set forth in claim 8, wherein said apertures are sufficiently elastic to stretch, to allow said heads to be inserted therethrough, and then return to their original shape and size.

* * * * *